United States Patent [19]
DeWitt

[11] Patent Number: 5,418,028
[45] Date of Patent: May 23, 1995

[54] COOLER WALL PANEL MEMBER AND METHOD OF MAKING SAME

[76] Inventor: L. J. DeWitt, 3459 Hamilton Mill Rd., Buford, Ga. 30518

[21] Appl. No.: 163,261

[22] Filed: Dec. 8, 1993

[51] Int. Cl.⁶ .............................. B32B 3/00; B32B 1/00
[52] U.S. Cl. .................................... 428/60; 428/71; 428/318.6; 428/319.3; 52/309.9
[58] Field of Search ............ 428/60, 71, 318.6, 318.8, 428/319.3; 52/309.9

[56] References Cited

U.S. PATENT DOCUMENTS

| | | | |
|---|---|---|---|
| 3,331,173 | 7/1967 | Elsner | 428/71 |
| 3,644,168 | 2/1972 | Bonk et al. | 428/318.8 |
| 4,463,043 | 7/1984 | Reeves et al. | 428/71 |

FOREIGN PATENT DOCUMENTS 49109  10/1986  Japan .............................. 428/71

Primary Examiner—Alexander S. Thomas
Attorney, Agent, or Firm—Kennedy & Kennedy

[57] ABSTRACT

A cooler wall panel has a foam polymer core that has a thermosetting polymer skin adhered directly to the core.

2 Claims, 2 Drawing Sheets

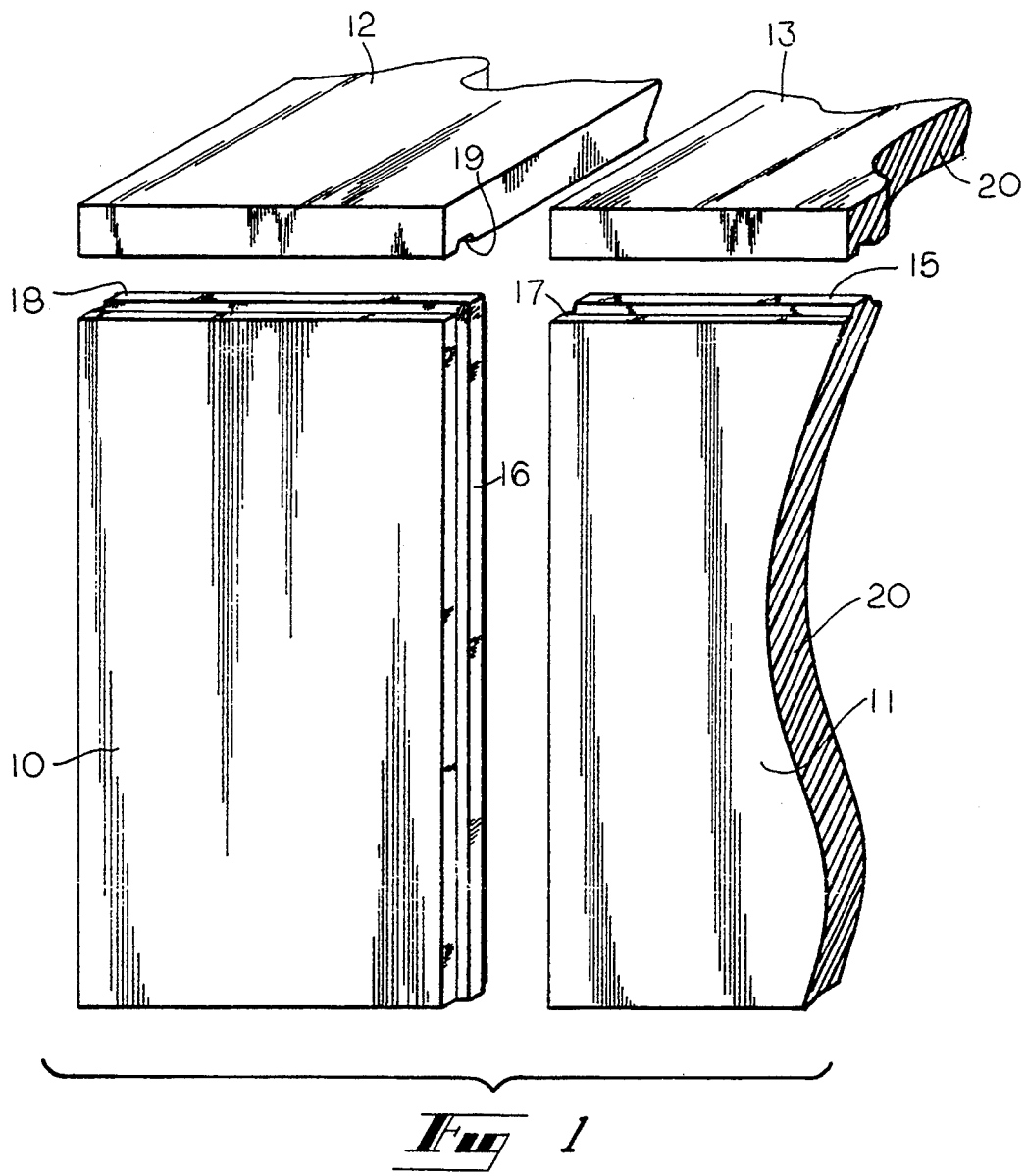
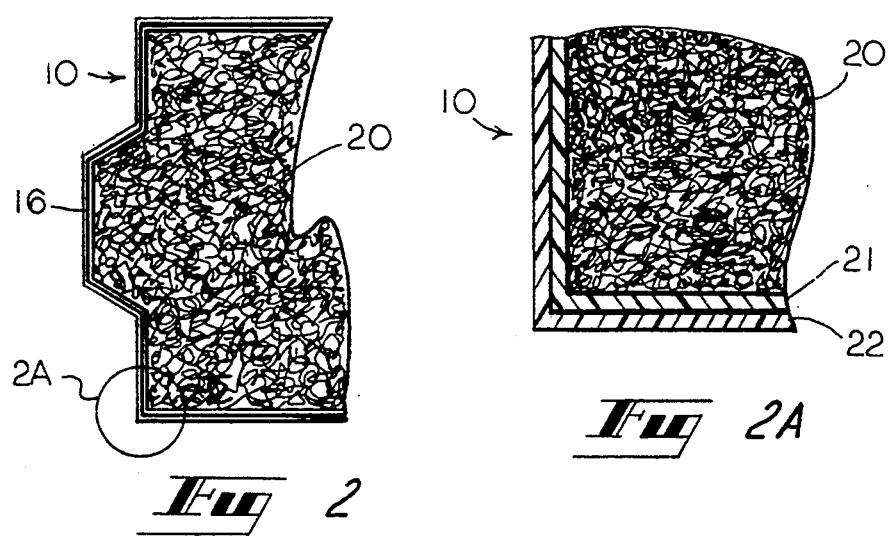

COOLER WALL PANEL MEMBER AND METHOD OF MAKING SAME

TECHNICAL FIELD

This invention relates generally to walk-in coolers that are used for maintaining goods under refrigeration, and particularly to the walls of such coolers.

BACKGROUND OF THE INVENTION

Walk-in type coolers, such as those commonly found in convenience stores, are typically constructed of thermally insulated panels that are fastened snuggly together to form interlocking side walls, ceilings and floors. The panels are usually comprised of foam insulation, such as expanded polystyrene and polyurethane, which are encased within thin metallic sheets. The panel ends are shaped to fit together in tongue-and-groove fashion and are provided with latch means for drawing and holding them snuggly together. These ends are not covered by the sheet metal so that their exposed tongues and grooves may be snuggle interfitted.

Metallic cases have been required to provide the panels with structural integrity since foam polystyrene and polyurethane, while possessing good thermal insulative properties, have little structural strength and can be easily fractured. The provision of metal casings, however, such as those formed from sheet aluminum, has rendered the panels costly to manufacture, heavy, and difficult to assemble. As previously stated, gaps in the metal casings have had to be provided to permit adjacent panels to be securely interfitted. Thus, prior to assembly the surface areas of the foam polymer cores have had to be exposed thereby rendering them subjectable to damage prior to assembly and erection. Assembly, whereby both a good interlock is achieved between the foam tongues and grooves as well as the metal casings, has been difficult to achieve consistently in the field. In addition, the metal casings have rapidly oxidized and deteriorated along their bottoms that are normally in direct contact with alkaline concrete flooring.

Accordingly, it is seen that a need exists for a thermal insulation panel of the type that may be used as components of cooler walls of a simplified, more economical type to manufacture and assemble and that does not rapidly oxidize and deteriorate. It is to the provision of such a panel therefore that the present invention is directed.

SUMMARY OF THE INVENTION

In one form of the invention a thermal insulation panel for use as a component of a cooler wall has an expanded foam core of polyisocyanurate, foam polyurethane or foam polystyrene. The foam core is encased with a thermosetting polymer coating of at least 30 mils thickness.

In another form of the invention a thermal insulation panel for use as a structural component of a cooler wall has a foam polyisocyanurate core and an aromatic polyisocyanurate skin adhered directly to the core.

In another form of the invention a method of making a cooler wall panel comprises the steps of spraying a thermosetting polymer on opposed inside surfaces of a mold of a size and shape to form a cooler wall panel with the mold in an open position and at a temperature elevated above standard room temperature. The mold is closed thereby forming an enclosed cavity. An expandable polymer is foamed in the mold cavity to form a core. The polymers are cured whereupon the thermosetting polymer becomes adhered directly to the foamed polymer core. The product is then removed from the mold.

In yet another form of the invention a method of making an integral cooler wall panel comprises the steps of spraying an aliphatic polyisocyanurate polymer onto the interior surfaces of a heated book mold that is in an open configuration to form an outer skin. An aromatic polyisocyanurate polymer is then sprayed onto the outer skin with the mold in an open configuration to form an inner skin. The mold is then closed and expandable polymer foamed in the mold to form a foam core. The product is then cured and removed from the mold.

BRIEF DESCRIPTION OF THE DRAWING

FIG. 1 is an exploded, perspective view of portions of panels forming the walls of a walk-in type cooler.

FIG. 2 is a plan view of an end portion of one of the panels illustrated in FIG. 1 while FIG. 2A is an enlarged view of a corner area of the structure illustrated in FIG. 2.

DETAILED DESCRIPTION

Figure 3:
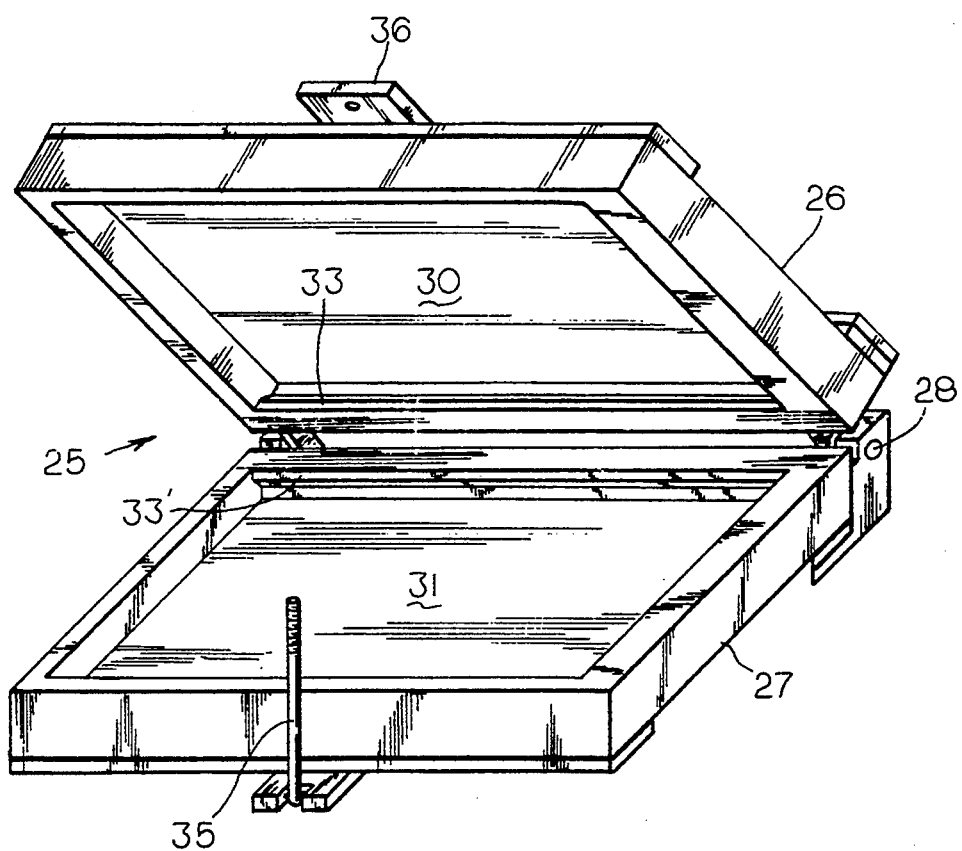
FIG. 3 is a perspective view of a book mold that is used in forming the panels illustrated in FIGS. 1 and 2 with the mold shown in an open configuration.

As previously stated, modern walk-in coolers, such as those found in stores that sell food products and beverages, are typically formed with a set of thermal insulative panels that are interlocked to form upright walls, ceilings and in some cases floors of a refrigerated room or cooler. End portions of the panels are formed with mating tongues and grooves so that they can be snuggly interlocked and held together as by latches. In FIG. 1 portions of two upright wall panels 10 and 11 of identical construction are shown positioned beneath two identical ceiling panels 12 and 13. The panel 10 is seen to have an elongated tongue 16 that extends along one upright side thereof that is positioned for insertion into an elongated groove 17 that extends along a confronting upright side of the panel 11. The top edge of the panel 10 also has a tongue 18 extending along its length that is sized, positioned and configured to be inserted into an elongated groove 19 that extends along the bottom of the ceiling panel 12. In the same manner panel 11 has a tongue 15 adapted to be inserted into a groove in the bottom of the ceiling panel 13. Floor panels may also be provided of the same construction as the ceiling panels. With this configuration of the several panels it is seen that they may be releasibly interlocked in snug, mating engagement to form a cooler.

Heretofore, cooler panels were typically formed of foam polystyrene blocks that were encased within aluminum casings. The foam polystyrene provided good thermal insulation while the aluminum casing provided the structural support and impact resistance necessary for the panels to function as wall elements. According to the present invention the need for aluminum or other metal type cases has been eliminated. Instead, an integral plastic cooler panel is provided that possesses sound structural and thermal insulating qualities that may be interconnected to form cooler walls.

The new insulative panel is seen in FIGS. 2 and 2A to have an expanded foam core 20 that has a coating of a thermosetting polymer of between 30 mils and 70 mils thickness. The coating here comprises two layers or skins 21 and 22. The inner layer 21 is formed of an aromatic polyisocyanurate polymer while the outer layer 22 is formed of an aliphatic polyisocyanurate polymer. The foam insulation here is preferably foam polyisocyanurate although it may be polyurethane or polystyrene.

As before mentioned, the expanded foam core 20 is preferably foam polyisocyanurate and the inner skin is an aromatic polyisocyanurate polymer. The aromatic polyisocyanurate polymer may be the sole layer in which case it should be at 30 to 70 mils thick to provide the necessary structural integrity and high impact resistance. Where the cooler is subject to direct sunlight the aromatic polyisocyanurate coating is preferably overlaid with the aliphatic polyisocyanurate coating or outer skin 22 to prevent discoloration, as shown in FIG. 2. In this case, the combined thickness of the two layers should be 30 to 70 mils thick.

The cooler panels are preferably formed with the use of a book mold, such as the mold 25 illustrated in FIG. 3. The mold here has an upper member 26 that is hinged to a lower member 27 by a hinge pin 28. The upper mold member has four side walls that project downwardly from a flat bed 30. Similarly, the bottom mold has four side walls that project upwardly from a flat bed 31. One wall of the upper member located beside the hinge pin 28 is formed with a projection 33. The bottom member has a similar projection 33'. When the mold is moved to a closed configuration, and latched with a latch pin 35 that extends through a hole in a plate 36, the two projections 33 and 33' collectively form a tongue to form a mold tongue for forming a groove in the product to be molded. The book mold of FIG. 3 shows only the wall that forms one groove for clarity of illustration. It should however, be understood that other walls of the mold are similarly formed with tongues and grooves to form the other tongues and grooves on the elements that make up the cooler wall, ceiling or floors, as required.

In making a cooler wall panel that has a single, uniform layer for the coating, an aromatic polyisocyanurate polymer is sprayed onto all of the interior walls of the book mold with the mold in an open configuration. This is done with the mold heated to approximately 120° F. The polymer is allowed one minute to cure and the mold then closed and latched. Polyisocyanurate is then foamed into the interior of the mold through an unshown mold port thereby completely filling the cavity formed by the coated interior surfaces of the mold. The foam is allowed some 7 to 8 minutes to cure. The resulting, integral panel is then removed from the mold.

In the case where a double layer skin is to be formed, an outer coating of an aliphatic polyisocyanurate is coated directly onto the interior walls of the heated mold and allowed to cure. An aromatic polyisocyanurate polymer is then spray coated onto the cured aliphatic polyisocyanurate coating and itself allowed to cure. The mold is then closed and polyisocyanurate foamed in it and also allowed to cure before product removal.

Specific coating materials that have been found to work well are available from Urylon Development, Inc. of Conyers, Ga. Specifically its TAP-Q-10, which is an aliphatic polyisocyanurate, has been found to provide a good aliphatic polymer coating material. Its Urylon-Q-10 provides a good aromatic polyisocyanurate coating. With the TAP-Q-10 and urylon-Q-10 used on foam polyisocyanurate the entire panel is constructed with both the core and each of its skins formed of polyisocyanurate type polymers. Thus, the resulting structure has outstanding chemical affinity between its laminate skin and foam core and yields a superior cooler panel having outstanding thermal insulative properties as well as structural integrity. Since no metal casing is now required, a substantial economy of manufacture is achieved. The resulting product is lightweight and very easy to handle and assemble.

It should be understood that the just described embodiment merely illustrates principles of the invention in a preferred form. Many modifications, additions, and deletions may be made thereto without departure from the spirit and scope of the invention as set forth in the following claims.

I claim:

1. A thermal insulation panel for use as a component of a cooler wall and with the panel having an expanded foam core selected from the group of materials consisting of foam polyisocyanurate, foam polyurethane and foam polystyrene that is encased with a thermosetting aromatic polyisocyanurate type polymer coating of at least 30 mils thickness and said polymer coating is coated with an aliphatic polyisocyanurate coating.

2. A thermal insulation panel for use as a structural component of a cooler wall and with the panel having a foam polyisocyanurate core, an aromatic polyisocyanurate skin adhered directly to the core and an outer layer of an aliphatic polyisocyanurate skin formed on said aromatic polyisocyanurate skin and with at least one side of the panel being formed in the shape of an elongated tongue and groove for panel interconnection.

* * * * *